Nov. 17, 1964  J. P. BRYDON  3,157,131
STRAINING APPARATUS
Filed June 10, 1960  5 Sheets-Sheet 1

Inventor
JOHN P. BRYDON
by: Harold G. Fox
Attorney

Nov. 17, 1964    J. P. BRYDON    3,157,131
STRAINING APPARATUS
Filed June 10, 1960    5 Sheets-Sheet 2

Inventor
JOHN P. BRYDON
by: Harold G. Fox
Attorney

Nov. 17, 1964

J. P. BRYDON 3,157,131

STRAINING APPARATUS

Filed June 10, 1960

Inventor
JOHN P. BRYDON
by: Harold G. Fay
Attorney

Nov. 17, 1964  J. P. BRYDON  3,157,131
STRAINING APPARATUS
Filed June 10, 1960  5 Sheets-Sheet 4

Inventor
JOHN P. BRYDON
by: Harold G. Fox
Attorney

Inventor
JOHN P. BRYDON
by: Harold G. Fox
Attorney

United States Patent Office 3,157,131
Patented Nov. 17, 1964

3,157,131
STRAINING APPARATUS
John Paterson Brydon, Vancouver, British Columbia,
Canada (514 Clifton Road, Richmond, British Columbia, Canada)
Filed June 10, 1960, Ser. No. 35,357
4 Claims. (Cl. 103—220)

This invention relates to straining apparatus. More particularly, this invention relates to straining apparatus of a type employing at least two filters, the apparatus being such that it is adapted for self-cleansing or solvent cleansing, in either case without interrupting the flow through the apparatus of a liquid to be filtered.

Accordingly, it is a prime object of my invention to provide self-cleansing straining apparatus.

It is another primary object of my invention to provide straining apparatus which may be cleansed by means of a solvent.

It is well known that there are many instances in industry and otherwise where it is necessary to strain liquids in order to remove foreign particles which are entrained therein. It has been common practice to filter such liquids by means of a filter or a series of filters placed in tandem in a pipe line through which the liquid is flowing, the filter or filters being constructed and interposed in the pipe line in such a manner that the liquid must pass therethrough. In passing through such filters, foreign particles entrained in the liquid are removed by the gauze, fine wire mesh, or other foreign particle removing matter which is located in the filter. Filters employed in this manner must be replaced from time to time, as eventually the number of foreign particles trapped in the filters will become so great that there may be present in the liquid flowing out of the filters a large number of foreign particles and flow of the liquid through the filters may be impeded or perhaps even halted. When the filter elements of such filters have to be replaced for the reasons previously mentioned, either the liquid flow must be interrupted until the replacement operation is finished, or a duplicate set of filters must be provided connected in parallel with the first set of filters, and the liquid flow must be diverted through the second set of filters when it is desired to replace the filter elements of the first set of filters. Replacing filter elements is time consuming and costly from the labour point of view, and if the filter element has a relatively short effective life, can also be costly from the materials point of view.

Accordingly, it is an object of my invention to provide straining apparatus which will enable a liquid to be continuously filtered without flow interruption.

It is another object of my invention to provide straining apparatus which does not require that the filter elements be replaced each time they become clogged.

In many filtering applications, it may be desirable to locate filtering apparatus in inaccessible locales, but because of the necessity of periodically changing the filter elements, it would not be possible to locate filtering apparatus of the type requiring periodic filter element replacement each time a filter became clogged in inaccessible locations. As one example of an application where it may be desirable or even necessary to locate filtering apparatus in an inaccessible locale, I refer to the bilge system of a ship. A conventional bilge system for a ship includes a main pump connected through a main strainer and various valve means with individual strainers in each of the different hatches of the ship. Long lengths of piping are used to connect the bilge strainers in each hatch with the main strainer. The bilge strainers in each hatch, the main strainer and the piping between the individual bilge strainers and the main strainer are susceptible to clogging by foreign particles entrained in the bilge water. However, because cargo is usually located over each of the bilge strainers and completely covers the same, they are inaccessible unless the cargo is removed. If for some reason or other there were an unusually large number of foreign particles entrained in the bilge water, a situation which would exist, for example, as a result of sea water forcing its way into the coal carrying hatch and carrying all the small particles of coal into the bilge water, the strainers and pipes could readily become clogged to such an extent that the bilge system could become inoperable, a situation which could conceivably result in the foundering of the ship, especially in heavy seas.

It is therefore another object of my invention to provide straining apparatus which can be placed in inaccessible locations where straining apparatus of the filter element replacement type either could not be placed because of the necessity to periodically change filter elements when they became clogged, or could only be placed in such inaccessible locations under some risk.

A further object of my invention is to provide straining apparatus of the type in which liquid to be filtered is strained in one filter and utilized to clean another filter, the respective functions of the filters being interchanged when the first filter strains inefficiently.

The replacement of the filter elements of prior art type filtering apparatus is generally left to chance, the filter element being replaced when the flow of liquid from the filter appears to contain foreign particles which have not been retained by the filter, or when the flow of liquid from the filter begins to appreciably decrease as a result of the steady clogging of the filter.

Accordingly, it is another object of my invention to provide straining apparatus which automatically diverts the liquid flow from one filter to another when the first filter becomes inefficient due to clogging.

A further object of my invention is to provide filtering apparatus which may be automatically operated by either electric or hydraulic means to provide uninterrupted continuous filtration and cleaning.

Another object of my invention is to provide straining apparatus which will permit continuous filtering with no flow interruption, but which employs only one filter suction inlet and one filter discharge outlet.

It is another object of my invention to provide straining apparatus of the aforementioned type in which the liquid flow does not reverse, i.e., the filter suction inlet is always the filter suction inlet, and the filter discharge outlet is always the filter discharge outlet.

Yet another object of my invention is to provide straining apparatus of the aforementioned type which only requires a single pump and a single motor to drive the pump.

Still another object of my invention is to provide straining apparatus having at least a pair of filters, the apparatus being constructed such that while one of the filters is delivering strained liquid, the other is being cleansed by a solvent, the respective functions of the filters being interchanged when the one filter strains inefficiently.

Briefly, in accordance with one embodiment of my invention I provide straining apparatus which comprises at least a pair of filters. The filters are connected to suitable valve means, the connections to the filters and the construction of the valve means being such that in one position of the valve means, liquid to be filtered is passed through one of the filters, which removes foreign particles from the liquid. The clean liquid from this first filter is then passed into the second filter in such a direction that foreign particles retained in the second filter are removed by the clean liquid passing therethrough, thereby cleaning the second filter. The liquid flowing out of the second filter is waste and may be suitably disposed of.

When the first filter becomes clogged, the valve means may be actuated automatically to a second position, in which position the liquid to be strained will be passed through the second filter and cleaned therein. The clean liquid from the second filter then will be passed through the first filter cleaning the same, the waste water from the first filter being suitably disposed of. In this embodiment of the invention a pump may be connected between the first and second filters to draw the clean water from the first filter and force it into the second filter or to draw the clean water from the second filter and force it into the first filter, depending on which position the valves are in. In this manner only clean water passes through the pump so that the pump cannot become clogged by particles entrained in the water to be filtered, or damaged by such particles.

The embodiment of my invention just described is particularly suitable for use in the bilge system of ships, since such apparatus can be located at various inaccessible points in a ship, the waste water being dumped overboard.

In another embodiment of my invention which is useful in cases where it is desired to utilize the clean liquid from the filters, e.g., where the liquid is oil, I provide a pump, the suction side of which is connected to one of the valves so as to permit the clean liquid from either of the filters to be removed from the filters through the pump and used in any desired manner. Also provided is a solvent cleaning system which comprises a source of solvent which is connected to one of the valves in such a manner that the filter not filtering the oil is cleaned by solvent forced therethrough. When the filter which is cleaning the oil becomes clogged or strains inefficiently, the valve means are automatically operated so that the other filter receives and cleans the oil while solvent is applied to the first filter to clean it.

Other objects, features and advantages of straining apparatus embodying my invention will become apparent from the following detailed description taken in conjunction with the drawings in which:

FIGURE 1 schematically illustrates one embodiment of straining apparatus constructed in accordance with my invention;

Figure 5:
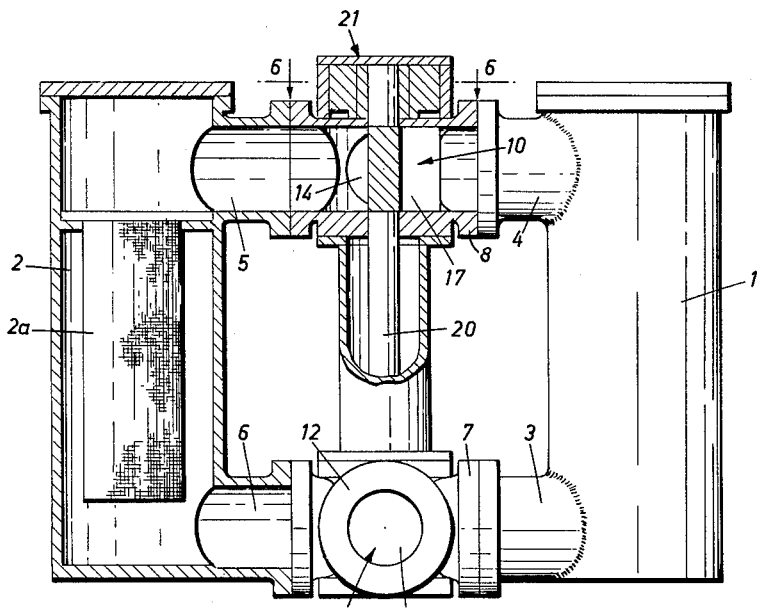
FIGURE 5 is a partial section of straining apparatus embodying my invention taken along line 5—5 in FIGURE 4.
Figure 4:
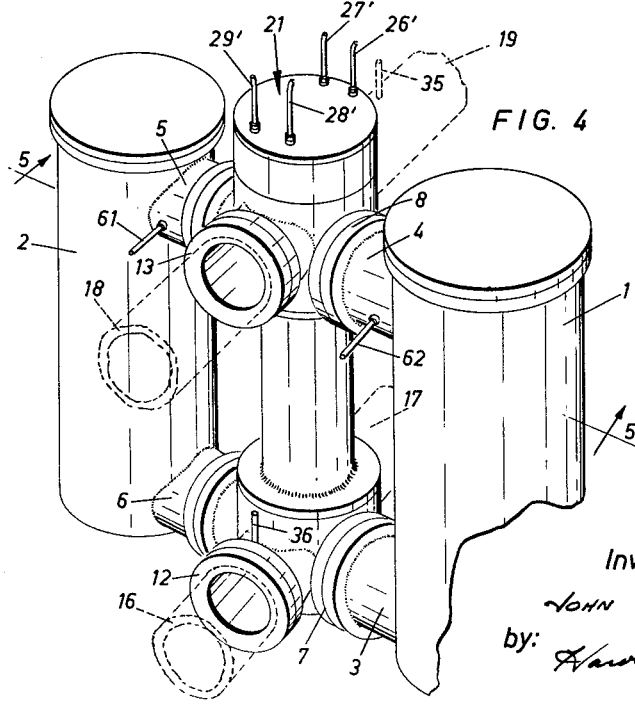
FIGURE 4 is a perspective view of another embodiment of my invention which is automatically operated by hydraulic means.
Figure 7:
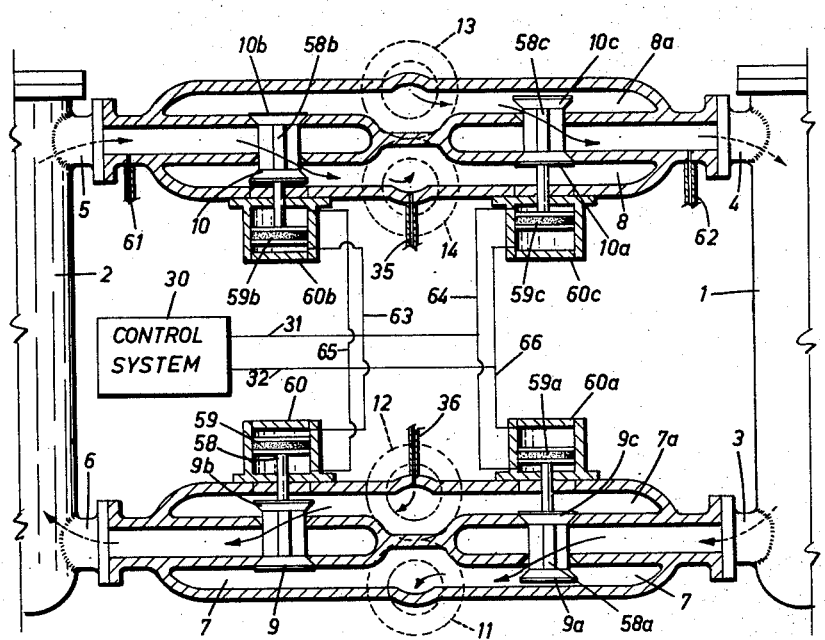
Figure 9:
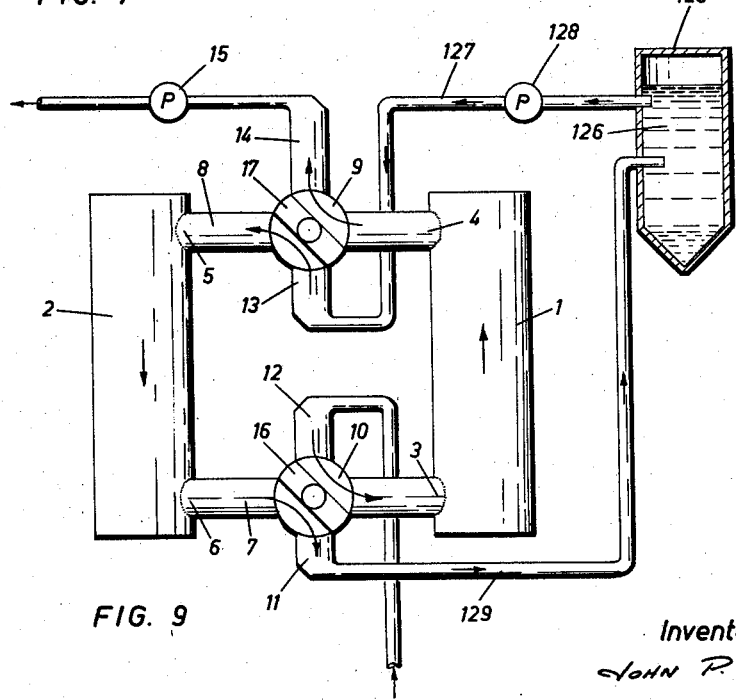
Figure 8:
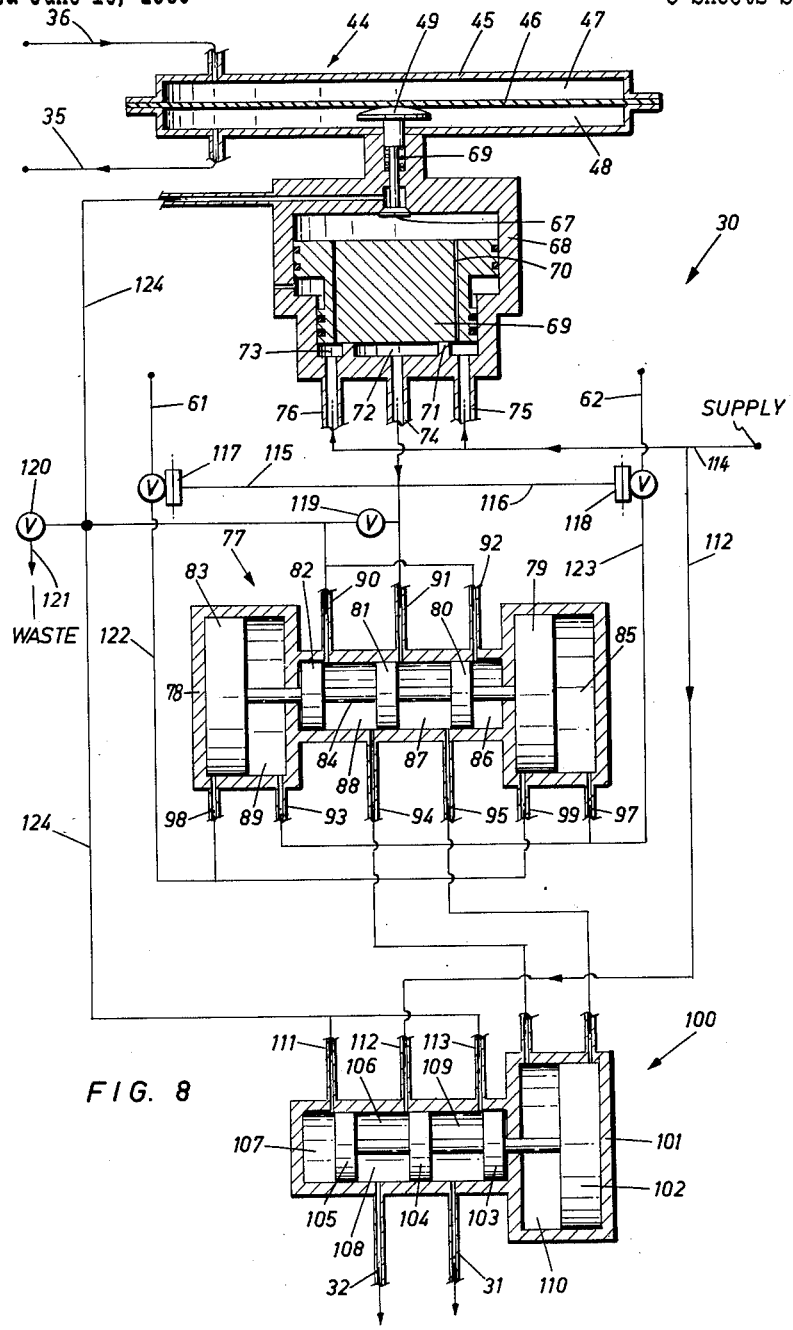

FIGURE 7 schematically illustrates yet another embodiment of my invention which is automatically operated by hydraulic means;

FIGURE 8 is a schematic view of hydraulic control apparatus for automatically operating the straining apparatus shown in FIGURES 4, 5 and 7; and FIGURE 9 schematically illustrates straining apparatus embodying my invention employed with a solvent cleanser system.

Figure 1:
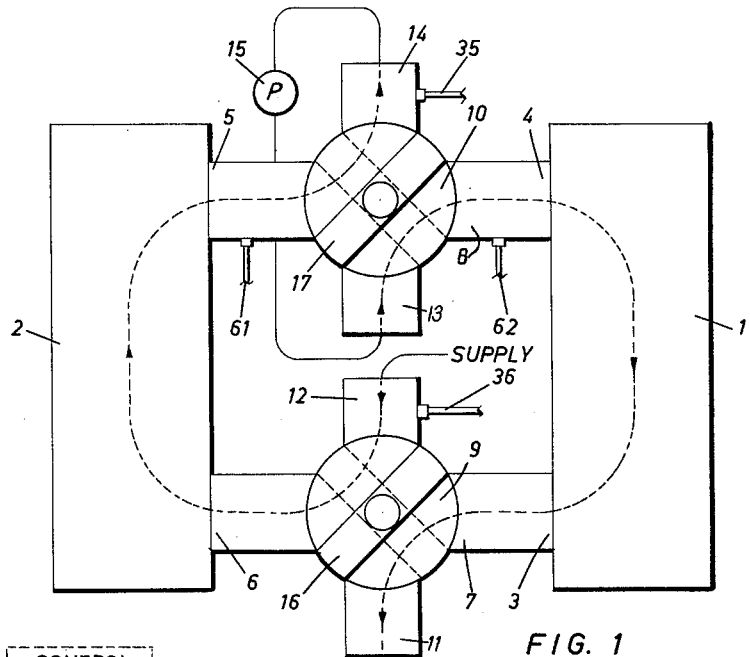

Before proceeding with a detailed description of the various embodiments of my invention, I wish to refer to FIGURE 1 for a general description of the operation of apparatus embodying my invention operating in the self-cleansing mode.

Referring, therefore, to FIGURE 1 I have shown a pair of filtering means 1 and 2 each including filters therein (not shown). Filter 1 is provided with inlet-outlet means 3 and 4 and filter 2 is provided with inlet-outlet means 5 and 6. Inlet-outlet means 3 and 4 are so disposed that liquid passing into one of the inlet-outlet means passes through the filter in filtering means 1 before passing out of the other inlet-outlet means. Similarly, inlet-outlet means 5 and 6 are so disposed that liquid passing into one of the inlet-outlet means passes through the filter in filtering means 2 before passing out the other inlet-outlet means. A liquid carrying member 7 connects inlet-outlet means 3 and 6 and another liquid carrying member 8 connects inlet-outlet means 4 and 5. Valve means 9 and 10 are positioned in liquid carrying member 7 and 8 respectively. Inlet means 12 and outlet means 11 are connected to liquid carrying member 7. Inlet means 13 and outlet means 14 are connected to liquid carrying member 8. A pump 15 has its suction end connected to outlet means 14 and its discharge end connected to inlet means 13 in fluid flow relationship. Valve means 9 and 10 are disposed in liquid carrying members 7 and 8 respectively in such a manner as to prevent any substantial direct liquid flow between inlet-outlet means 3 and 6 and inlet-outlet means 4 and 5 respectively. Thus, liquid passing between inlet-outlet means 4 and 5 must pass through pump 15. Valve means 9 and 10 also prevent any substantial direct liquid flow between inlet means 12 and outlet means 11 and between inlet means 13 and outlet means 14 respectively. As mentioned above, liquid passing between inlet means 13 and outlet means 14 must pass through pump 15. Inlet means 12 is immersed in or connected to a pipe which is immersed in the liquid to be filtered.

The operation of the straining apparatus shown in FIGURE 1 will now be described. In the position of valve means 9 and 10 shown in solid outlines, the liquid to be filtered is drawn through inlet means 12 and passes through liquid carrying member 7, inlet-outlet means 6 and filtering means 2 in the direction shown by the arrows. The liquid passing out through inlet-outlet means 5 is clean, any foreign particles previously entrained in the liquid having been removed in filtering means 2. The liquid passes out through inlet-outlet means 5, through liquid carrying member 8, valve means 10, outlet 14 and pump 15 and is introduced again into liquid carrying member 8 through inlet means 13. The liquid then passes into inlet-outlet means 4, and through filtering means 1 in the direction shown by the arrow. The clean liquid passing through filtering means 1 removes any foreign particles from the filter contained therein, and thus the liquid emerging from inlet-outlet means 3 contains entrained foreign particles. This liquid is passed through liquid carrying member 7 and valve 9 and is discharged as waste through outlet means 11. Thus it will be apparent that while filtering means 2 is removing entrained particles from the liquid and permits clean liquid to pass through pump 15, filtering means 1 is itself being cleaned by the clean liquid passing therethrough. When filtering means 2 becomes clogged and strains inefficiently, the movable members 16 and 17 of valve means 9 and 10 respectively may be moved to the position shown by the dotted outlines in FIGURE 1. Members 16 and 17 may be moved automatically as will become more apparent hereinafter, but they also may be moved manually. In this second position it will be apparent that the liquid path is as follows: inlet means 12, valve means 9, liquid carrying member 7, inlet-outlet means 3, filtering means 1, inlet-outlet means 4, liquid carrying member 8, valve means 10, outlet means 14, pump 15, inlet means 13, valve means 10, liquid carrying member 8, inlet-outlet means 5, filtering means 2, inlet-outlet means 6, liquid carrying member 7, valve means 9 and outlet means 11. Thus in this second position filtering means 1 is employed to strain the liquid drawn through inlet means 12, while filtering means 2 is cleaned by the clean liquid passing therethrough. It will be noted that only the functions of filtering means 1 and 2 interchange from one position of movable members 16 and 17 to the other, and that the direction of rotation of the pump does not change, and that inlet means 12 remains the inlet while outlet means 11 remains the outlet.

The embodiment of my invention just described is particularly suitable for use in the bilge system of a ship, such apparatus being located in the various hatches of the ship, and the waste liquid from outlet means 11 being discharged overboard. Such apparatus is particularly suitable for such an application since the changeover from one filter to the other may be made automatically, and hence the straining apparatus may be located in inaccessible locales, as may be desired or necessary.

While the straining apparatus just described is of the self-cleansing type, it is also adapted for solvent cleansing as will become more apparent in connection with the later description of FIGURE 9.

Hydraulically Operated Straining Apparatus No. 1

Figure 6:
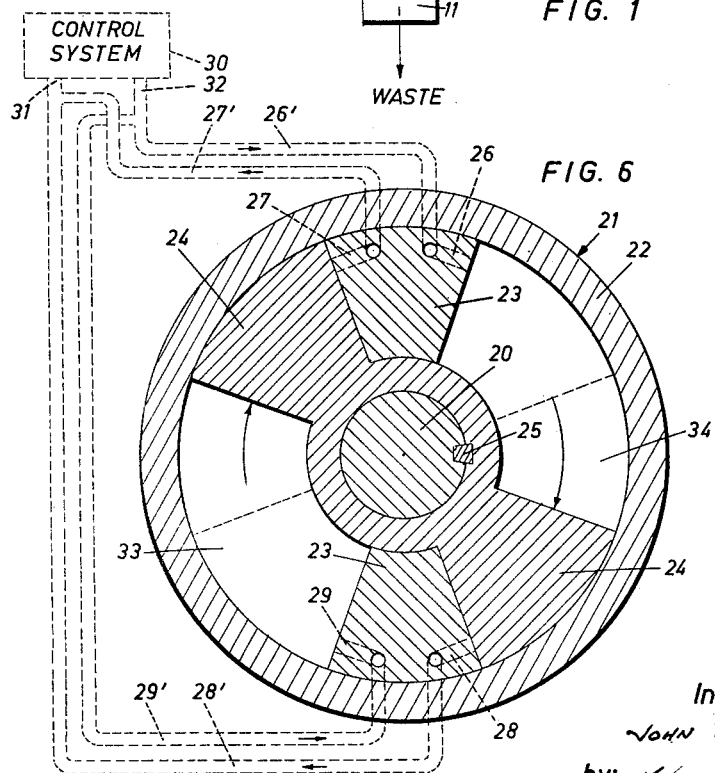
FIGURE 6 is a sectional view taken along line 6—6 of FIGURE 5 and shows a part of the hydraulic control apparatus.

One embodiment of hydraulically operated straining apparatus constructed in accordance with my invention is shown in FIGURES 4, 5 and 6. Referring to these figures I have shown filtering means 1 and 2 each having filters therein only one of which is shown and designated as 2a. Filtering means 1 is provided with inlet-outlet means 3 and 4 which are flanged pipes opening into filtering means 1. Similarly, filtering means 2 is provided with inlet-outlet means 5 and 6 which are flanged pipes opening into filtering means 2. A liquid carrying member 7 is connected to inlet-outlet means 3 and 6 and is shown as a flanged pipe secured by bolts to the flanges of inlet-outlet means 3 and 6. A liquid carrying member 8, which is shown as a flanged pipe, is secured to inlet-outlet means 4 and 5 by means of bolts passing through the flanges of the liquid carrying member and the flanges of inlet-outlet means 4 and 5. Inlet means 12 comprising a flanged pipe is connected to liquid carrying member 7. Outlet means comprising a similar flanged pipe is connected to liquid carrying member 7 diametrically opposite inlet means 12. Inlet means 12 may be connected to a suitable pipe 16 while the outlet means may be connected to a suitable pipe 17. Inlet means 13 is connected to liquid carrying member 8 and is shown as a flanged pipe. Outlet means 14 comprising a similar flanged pipe located diametrically opposite inlet means 13 is also connected to liquid carrying member 8. Inlet means 13 is connected to a pipe 18 and outlet means 14 is connected to a pipe 19. In the self-cleansing embodiment of my invention, pipe 18 is connected to the discharge end of a pump, whereas pipe 19 is connected to the suction end of a pump as may be seen from FIGURE 1. Valve means 9 and 10 are provided in liquid carrying members 7 and 8 respectively. Valve means 9 includes a member 16 and valve means 10 includes a member 17. Members 16 and 17 are connected to a valve shaft 20 and are positioned on the shaft in aligned relationship with one another. Shaft 20 is connected to a hydraulic motor 21 which will be more fully described hereinafter. Valve means 9 and 10 including members 16 and 17 are constructed such that valve means 9 prevents any substantial direct liquid flow between inlet-outlet means 3 and 6 and also prevents any substantial direction liquid flow between inlet means 12 and the outlet means to which pipe 17 is connected, while valve means 10 prevents any substantial direct liquid flow between inlet-outlet means 4 and 5 and between inlet means 13 and outlet means 14, as best shown in FIGURE 1.

Referring now to FIGURE 6, hydraulic motor 21 includes a casing 22, a stator 23 fixed to casing 22, and a rotor 24 movable with respect to stator 23. Rotor 24 is connected by means of a key 25 to valve shaft 20. Openings 26, 27, 28 and 29 are provided in stator 23 and are connected through suitable piping 26', 27', 28' and 29' to a control system 30, pipes 26' and 29' being fed in parallel through pipe 32 and pipes 27' and 28' being fed in parallel through pipe 31. Fluid, preferably a liquid such as water, flows from or into control system 30 by means of pipes 31 and 32, the fluid pressure in pipes 31 and 32 being different. In the position of rotor 24 shown in FIGURE 6, the fluid pressure in pipe 32 and hence pipes 26' and 29' is greater than the fluid pressure in pipes 31, 27' and 28'. Hence the fluid in pipes 26' and 29' will be injected into the chambers 33 and 34 filling the chambers and requiring rotor 24 to assume the position shown in FIGURE 6. In order for rotor 24 to be rotated counter-clockwise to the position shown by the dotted outlines in FIGURE 6, it is only necessary that the fluid pressure in pipe 31 be increased by the control system to a value such that it exhausts the fluid in chambers 33 and 34 through pipe 32. When this is done, rotor 24 will have rotated in a counter-clockwise direction and the fluid in chambers 33 and 34 will have been forced from the chambers through openings 29 and 26 and pipes 29' and 26' respectively, the chambers left behind rotor 24 being filled by fluid injected through openings 27 and 28. Hydraulic motor 21 is, of course, suitably sealed so that no fluid can escape therefrom. Since rotation of rotor 24 will cause shaft 20 to rotate and members 16 and 17 are secured to shaft 20, it will be apparent that I have provided hydraulic means whereby members 16 and 17 may be moved from one position to another, these two positions being best illustrated in FIGURE 1. As will become apparent from a later detailed consideration of FIGURE 8, control system 30 is automatically operable to position members 16 and 17 in either of their two positions. For the purposes of discussing the operation of straining apparatus shown in FIGURES 4 and 5, however, it will be assumed that hydraulic motor 21 is automatically operated without first explaining the means whereby it is automatically operated.

The embodiment of my invention illustrated in FIGURES 4 and 5 functions in exactly the same manner as was described with reference to the schematic illustration of my invention shown in FIGURE 1. Thus it will be apparent that when members 16 and 17 are in one position, liquid is drawn through pipe 16 and through inlet means 12 connected thereto, passing through valve means 9, liquid carrying member 7, inlet-outlet means 6, filter 2a, inlet-outlet means 5, liquid carrying member 8, valve means 10, outlet means 14 and pipe 19. Liquid passing through pipe 19 may pass through a pump the suction end of which is connected thereto, the liquid then being passed from the discharge end of the pump through pipe 18, inlet means 13, valve means 10 and liquid carrying member 8, only clean liquid from filtering means 2 being passed through the pump. The liquid is then passed through inlet-outlet means 4, filtering means 1, inlet-outlet means 3, liquid carrying member 7, valve means 9 and out through the outlet means and pipe 17. Thus in this position of members 16 and 17, filtering means 2 strains the liquid while filtering means 1 is cleaned by the clean liquid previously filtered by filtering means 2. When filtering means 2 becomes clogged and strains inefficiently there will be a pressure differential across the filtering means which may be sensed and used to activate control system 30 to cause members 16 and 17 and shaft 20 to be rotated by hydraulic motor 21 into the other position of members 16 and 17. For this purpose pipes 35 and 36 are connected in fluid flow relationship with outlet means 14 and inlet means 12 respectively. The difference in pressure between the liquid in pipes 35 and 36 is used to operate control system 30 as will become more apparent hereinafter. When the pressure differential between the liquid in pipes 35 and 36 reaches a predetermined magnitude, control system 30 will operate in such a manner as to cause shaft 20 and members 16 and 17 to rotate to the other position thereof shown in the dotted outlines in FIGURE 1. In this position filtering means 1 will be employed to strain the liquid flowing into pipe 16, while filtering means 2 will be cleaned by the clean liquid passing into filtering means 2 through inlet-outlet means 5. The waste liquid from filtering means 2 will pass out of the apparatus through the outlet means and pipe 17. Thus it will be apparent that the function of filtering means 1 and 2 depends upon the position of members 16 and 17, one of the filtering means straining liquid in one position, while the other is being cleaned, and their respective roles being interchanged in the other position of members 16 and 17, but it will be noted that liquid is always drawn through pipe 16, and expelled through pipe 17, i.e. the function of the inlet means and the outlet means connected to liquid carrying member 7 is the same no matter in which position are members 16 and 17.

*Electrically Operated Straining Apparatus*

Figure 2:
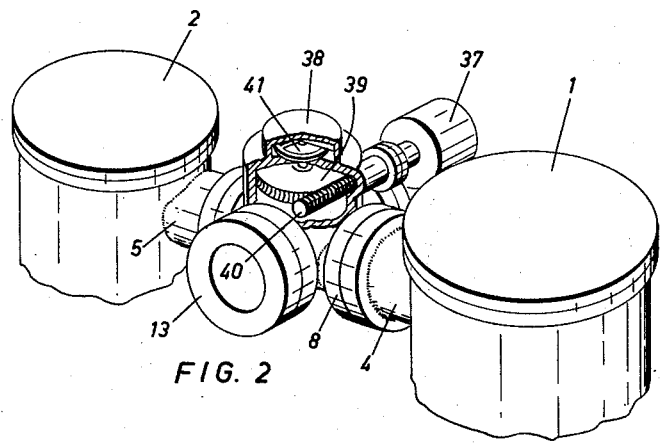
FIGURE 2 illustrates a part of straining apparatus embodying my invention, which straining apparatus is automatically operated by electrical means, part of the straining apparatus being cut away.
Figure 3:
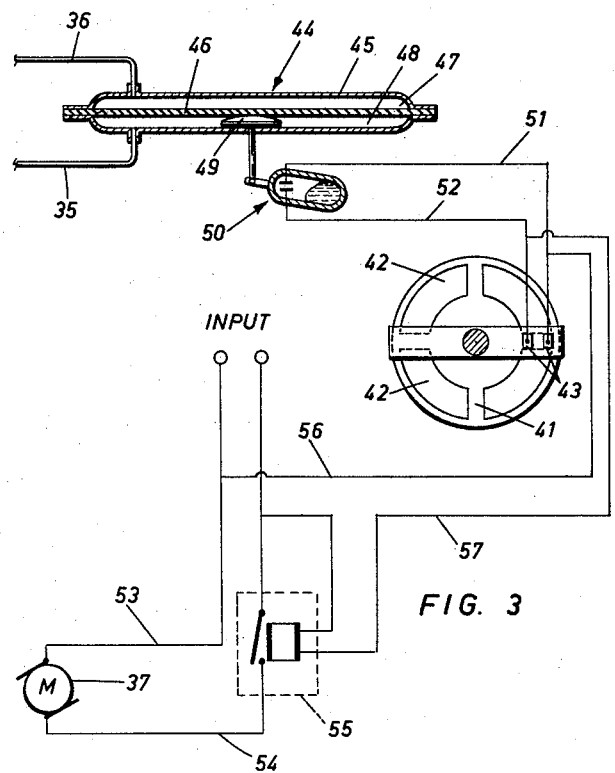
FIGURE 3 shows the control circuitry for operating the apparatus shown in FIGURE 2.

One embodiment of electrically operated straining apparatus constructed in accordance with my invention is shown in FIGURES 2 and 3.

Referring to FIGURE 2, only the upper portion of the straining apparatus has been shown because the straining apparatus shown in FIGURE 2 is identical to that shown in FIGURE 4, except that hydraulic motor 21 has been replaced by an electric motor 37 and suitable gearing and other mechanical and electrical parts now to be described. In all other respects, however, the apparatus shown in FIGURE 2 is identical to the apparatus shown in FIGURE 4, and like numerals designate like parts.

Referring to Figure 2 I have shown a housing 38 which contains a gear 39 which is connected to valve shaft 20 (not shown) by any suitable means such as a key. The shaft of motor 37 is connected through suitable reduction gearing to a worm gear 40 which drives gear 39. Coupled to gear 39 and valve shaft 20 and rotatable therewith, is an insulating disc 41 (best shown in FIGURE 3) having conductive segments 42 thereon. Also positioned in housing 38 are a pair of brushes 43, mounted on a brush holder and which contact insulating disc 41 and the conductive segmetns thereon.

Referring now to FIGURE 3, I have shown a control circuit for motor 37 which automatically will permit motor 37 to rotate valve shaft 20 and member 16 and 17 from one position thereof to another. This control circuit includes a diaphragm valve 44 which comprises an envelope 45 having a flexible diaphragm 46 mounted therein and dividing envelope 45 into two chambers 47 and 48. Communicating with chamber 47 is pipe 36 (FIGURE 1), and communicating with chamber 48 in pipe 35. Diaphragm 46 bears on a plunger 49 which is connected to a mercury switch 50 One contact of mercury switch switch 50 is connected to one of the brushes 43 through a conductor 51, while the other contact of mercury switch 50 is connected to the other brush 43 through a conductor 52. Motor 37 is connected through conductors 53 and 54 to a suitable source of electrical energy through the contacts of a contactor 55. One contact of mercury switch 50 is connected through conductors 51 and 56 to conductor 53, while the other contact of mercury switch 50 is connected through conductors 52 and 57 and the coil of contactor 55 to conductor 54.

Operation of the control system shown in FIGURE 3 will now be discussed. When the control circuitry is in the position illustrated in FIGURE 3 with mercury switch 50, and the contactor contacts open, and brushes 43 in contact with an insulating portion of disc 41, members 16 and 17 are in one of the positions shown in FIGURE 1, and one filter is straining while the other is being cleaned. It will be assumed that members 16 and 17 are in the position shown by the solid outline in FIGURE 1 so that filter 2 is straining and filter 1 is being cleaned. As filter 2 strains the liquid passing therethrough and retains more and more foreign particles that are entrained in the liquid passing through inlet-outlet means 6, a pressure differential will be built up between pipes 35 and 36, the pressure in pipe 35 becoming gradually lower than the pressure in pipe 36. This will cause a downward flexure of diaphragm 46 which, when the pressure reaches a predetermined magnitude, will close mercury switch 50. When mercury switch 50 is closed, the coil of contactor 55 is energized from the source of electrical energy through conductors 56, 51, switch 50, conductor 52, conductor 57, coil of contactor 55 and back to the source of electrical energy. Energization of the coil of contactor 55 closes the contactor contacts completing a circuit from the source of electrical energy through conductor 53, motor 37, conductor 54, the contactor contacts and back to the source of electrical energy. Motor 37, thus energized, will rotate valve shaft 20 through worm gear 40 and gear 39 thereby causing members 16 and 17 to rotate from the position shown in the solid outlines in FIGURE 1 to the position shown in the dotted outlines. This is achieved as follows: insulating disc 41 is rotated by motor 37 causing one of conductive segments 42 to bridge brushes 43, thereby short-circuiting the contacts of mercury switch 50. As members 16 and 17 rotate from one position to another, the pressure in pipes 35 and 36 equalizes causing diaphragm 46 to revert to the position shown in FIGURE 3 thereby opening mercury switch 50. Plunger 49 may be suitably spring biased to permit it to return to the position shown in FIGURE 3. However, the coil of contactor 55 remains energized through the circuit comprising the source of electrical energy, conductor 56, brushes 43 and the conductive segment bridging the same, conductor 57, the coil of contactor 55 and back to the source of electrical energy. Thus motor 37 continues to rotate after mercury switch 50 has been returned to its normally open position. Motor 37 will continue to rotate until insulating disc 41 has rotated to a position such that brushes 43 contact the insulating gap provided between conductive segments 42. This gap between conductive segments 42 is just sufficiently wider than brushes 43 that no conductive path between the brushes can be established when the brushes are resting on the insulating gap. When in this position the coil of contractor 55 is de-energized, and the contactor contacts are opened disconnecting motor 37 from the source of electrical energy and causing motor 37 to cease its rotation. Brushes 43 and conductive segments 42 are proportioned such that motor 37 will cause members 16 and 17 and valve shaft 20 to rotate from the position thereof shown in the solid outline in FIGURE 1 to the dotted position thereof in FIGURE 1, the source of electrical energy being disconnected from motor 37 when members 16 and 17 reach the dotted position. When members 16 and 17 are rotated to the dotted position shown in FIGURE 1, filter 1 is used to strain the liquid passing through inlet means 12, while filter 2 is cleaned by the clean liquid passing therethrough. When filter 1 becomes clogged and strains inefficiently the foregoing process will be repeated with motor 37 rotating members 16 and 17 to the position shown in solid outlines in FIGURE 1, filter 2 again performing the filtering function while filter 1 is cleaned.

*Hydraulically Operated Straining Apparatus No. 2*

Another embodiment of hydraulically operated straining apparatus constructed in accordance with my invention is illustrated in FIGURE 7. Referring to this figure, I have shown portions of filtering means 1 and 2 each having filters (not shown) positioned therein. Filtering means 1 is provided with inlet-outlet means 3 and 4 which comprise flanged pipes opening into filtering means 1. Filtering means 2 is provided with inlet-outlet means 5 and 6 which comprise flanged pipes opening into filtering means 2. Liquid carrying members 7, 7a, 8 and 8a are connected by means of suitable flanged piping to inlet-outlet means 3 and 6 and inlet-outlet means 4 and 5 respectively. Valves 9 and 9a are provided in liquid carrying member 7 between inlet-outlet means 6 and inlet-outlet means 3 respectively. Valves 9b and 9c are provided in liquid carrying member 7a between liquid carrying member 7a and inlet-outlet means 6 and 3 respectively. Valves 10 and 10a are provided between liquid carrying member 8 and inlet-outlet means 5 and 4 respectively. Valves 10b and 10c are provided between liquid carrying member 8a and inlet-outlet means 5 and 4 respectively. Valves 9 and 9b are connected to a valve shaft 58 which is connected to a piston 59 in a cylinder 60, the spacing between valves 9 and 9b being such that when one of them is closed, the other is open. Valves 9c and 9a, valves 10b and 10, and valves 10c and 10a are connected to valve shafts 58a, 58b, and 58c respectively, the valve shafts being connected to the pistons 59a, 59b and 59c respectively in cylinders 60a, and 60b and 60c respectively, each pair of valves connected to a valve shaft being spaced apart such that when one of the valves associated with the pair is closed, the other is open. Outlet means 11 shown as a flanged pipe is connected in fluid flow relationship with liquid carrying member 7. Inlet means 12, a flanged pipe, is connected in fluid flow relationship with liquid carrying member 7a. Similar outlet means 14 and inlet means 13 are connected in fluid flow relationship with liquid carrying members 8 and 8a respectively. A pump may be connected between inlet means 13 and outlet means 14, the suction end of the pump being connected to outlet means 14 and the discharge end being connected to inlet means 13. Pipes 35 and 36, communicating with liquid carrying members 8 and 7a respectively, are employed to sense any pressure differential across the filtering means which is being employed to filter a liquid, this pressure differential being used as a control signal for a control system 30, as will be more apparent hereinafter. Pipes 61 and 62 are connected in fluid flow relationship with inlet-outlet means 5 and 4 respectively for a purpose that will become more apparent hereinafter. A pair of fluid carrying pipes 31 and 32 are connected to a control system 30, pipe 31 being connected to pipes 63 and 64, and pipe 32 being connected to pipes 65 and 66. Pipe 63 is in fluid flow relationship with the interior of cylinder 60b below piston 59b and the interior of cylinder 60 above piston 59. Pipe 64 is in fluid flow relationship with the interior of cylinder 60c above piston 59c and with the interior of cylinder 60a below piston 59a. Pipe 65 is in fluid flow relationship with the interior of cylinder 60b above piston 59b and the interior of cylinder 60 below piston 59. Pipe 66 is fluid flow relationship with the interior of cylinder 60c below piston 59c and the interior of cylinder 60a above piston 59a.

Before discussing in detail the components and operation of control system 30, the operation of the straining apparatus shown in FIGURE 7 and just described will be described. When the straining apparatus is in the position shown in FIGURE 7 with valves 9c, 9, 10b and 10a closed and valves 9a, 9b, 10 and 10c open, the pressure in cylinder 60 below piston 59 is greater than the pressure above piston 59, the pressure below piston 59c is greater than the pressure above piston 59c, the pressure above piston 59b is greater than the pressure below piston 59b, and the pressure above piston 59a is greater than the pressure below piston 59a. These pressure differentials in each of the cylinders are caused by control system 30 as will be more adequately explained hereinafter. When the valves are in the positions shown in FIGURE 7, liquid to be strained is drawn through inlet means 12, passes through liquid carrying member 7a, valve 9b, inlet-outlet means 6 and filtering means 2, the liquid emerging from filtering means 2 through inlet-outlet means 5 being clean. This clean liquid is passed through valve 10 into liquid carrying member 8, out outlet means 14, through a pump connected thereto and into inlet means 13. The clean liquid then flows through liquid carrying member 8a, valve 10c, inlet-outlet means 4, through filtering means 1, out inlet-outlet means 3, through valve 9a, liquid carrying member 7 and out outlet means 11. Thus it will be seen that while filtering means 2 is employed to strain liquid passing therethrough, filtering means 1 is cleaned by the clean liquid from filtering means 2, only clean liquid passing through the pump. When filtering means 2 becomes clogged or commences to strain inefficiently, a pressure differential will be built up between pipes 35 and 36, which pressure differential, when it reaches a predetermined magnitude, will operate control system 30 in a manner to be described so that the fluid pressure in pipes 31, 63 and 64 is made greater than the fluid pressure in pipes 32, 65 and 66. This will cause pistons 59a and 59b to rise to the top of cylinders 60a and 60b, whereas pistons 59 and 59c will be forced to the bottom of cylinders 60 and 60c respectively. In this manner the valves which are shown as open in FIGURE 7 will become closed, while the valves which are shown as closed will become open. It will be apparent from a consideration of FIGURE 7 that when the valves have so changed their positions, liquid to be filtered will be passed through filtering means 1, and the clean liquid emerging therefrom will be passed through filtering means 2 cleaning the same. When filtering means 1 becomes clogged and a pressure differential of a predetermined magnitude is reached between pipes 35 and 36, control system 30 will be operated automatically to cause the pistons and valves to return to the positions shown in FIGURE 7.

*Hydraulic Control System*

In FIGURE 8 I have shown a hydraulic control system 30 which may be used with the embodiments of my invention illustrated in FIGURES 4, 5, 6 and 7.

Referring to FIGURE 8, I have shown a diaphragm valve 44 comprising an envelope 45 containing a flexible diaphragm 46 therein. Diaphragm 46 divides the interior of envelope 45 into two compartments 47 and 48. A pipe 35 (see FIGURES 4 and 7) is connected to chamber 48 in fluid flow relationship therewith, and a pipe 36 is connected to chamber 47 in fluid flow relationship therewith. Diaphragm 46 bears on a plunger 49 which is connected to a valve 67 in a cylinder 68. A compression spring 69 bears upwardly against plunger 49 and permits plunger 49 to be returned to the position shown after deflection by diaphragm 46. Positioned in cylinder 68 is a piston 69 having small passageways 70 therethrough. An annular ring 71 is positioned on the inside of the bottom wall of cylinder 68, and with piston 69 defines a chamber 72 and an annular chamber 73. A pipe 74 communicates with chamber 72, and pipes 75 and 76 communicate with annular chamber 73.

A differential control 77 is provided and includes a housing 78 having pistons 79, 80, 81, 82 and 83 connected to a common shaft 84 mounted therein. A plurality of chambers 85, 86, 87, 88 and 89 are formed by the pistons and housing. Pistons 79 to 83 and shaft 84 are movable as a unit longitudinally in housing 78. In the position of the pistons shown, pipes 90, 91 and 92 communicate with chambers 84, 87 and 86 respectively, while pipes 93, 94, 95 and 97 communicate with chambers 89, 88, 87 and 85 respectively. Pipes 98 and 99 communicate with the interior of housing 78. Pipes 94 and 95 are connected to a servo motor hold control 100 which comprises a housing 101 having pistons 102, 103, 104 and 105 secured to a common shaft 106 mounted therein. The pistons and shaft 106 are movable longitudinally as a unit in housing 101, and in the position of the pistons shown in FIGURE 8, define with housing 101, chambers 107, 108, 109 and 110. Pipe 94 communicates with chamber 110. Pipes 111, 112 and 113 communicate with chambers 107, 108 and 109 respectively, while outlet pipes 31 and 32 (see also FIGURES 6 and 7) communicate with chambers 109 and 108 respectively. A pipe 114 is connected to a source of primary hydraulic fluid of any suitable type, such as, for example, water or oil. If water is employed it should contain a lubricating material for the seals, packings and moving parts. Pipe 114 is also connected to pipes 76 and 75. Pipe 74 is connected with pipe 91, and also by means of pipes 115 and 116 to diaphragm valves 117 and 118, which open or close valves in pipes 61 and 62 (see also FIGURES 4 and 7). Pipe 74 is also connected through a regulating needle valve 119, piping and check valve 120 to a waste or return discharge pipe 121, pipes 90 and 92 also being connected to waste discharge pipe 121 through check valve 120. The discharge from pipe 121 may be recirculated by connecting pipe 121 to the source of primary hydraulic fluid, or if the fluid is expendable it may be discharged as waste and not re-used. A pipe 122 is connected from diaphragm valve 117 to each of pipes 98 and 99. A pipe 123 is connected from diaphragm valve 118 to each of pipes 93 and 97. The source of primary fluid is connected through pipe 114 and pipe 112 to the interior of housing 101 of servo motor hold control 100. A pipe 124 connected to pipes 111 and 113 communicates with the interior of cylinder 68 above piston 69 when valve 67 is in the open position.

The operation of control apparatus 30 shown in FIGURE 8 will now be described. Control apparatus 30 may be used with the embodiments of my invention shown in FIGURES 4 to 7, but will be hereinafter described in connection with the automaic operation of straining apparatus of the type shown in FIGURE 7.

While any suitable fluid may be used as a source of primary supply flowing in pipes 114 and 112, it is preferable that water or oil be employed, and the operation of control apparatus 30 will be described assuming that water is the controlling fluid.

When the various pistons of control apparatus 30 are in the positions shown in FIGURE 8 and valve 67 is closed, primary water is fed from the source of supply through pipe 112 into chamber 108 and out pipe 32 which is connected to pipes 65 and 66 in FIGURE 7 (pipes 26' and 29' in FIGURE 6). On the other hand, pipe 31 which is connected to pipes 63 and 64 (FIGURE 7, pipes 27' and 28' in FIGURE 6) is connected through chamber 109, pipes 113 and 124 and check valve 120 to waste or return discharge line 121. When this is the case, pistons 59, 59b, 59c and 59a will be in the position shown in FIGURE 7, and four of the valves will be open while the other four will be closed, as shown. In this configuration, filtering means 2 is straining liquid passed therethrough, while filtering means 1 is being cleaned. As filtering means 2 becomes clogged with particles removed from the liquid passing therethrough, a pressure differential builds up between pipes 35 and 36, the pressure in pipe 35 becoming lower than the pressure in pipe 36. This pressure differential appears across diaphragm 46, and when the pressure differential reaches a predetermined magnitude, diaphragm 46 deflects downwardly forcing plunger 49 downwardly against spring 69 and opening valve 67. When valve 67 opens, water in cylinder 68 above piston 69 drains out through valve 67, pipe 124, check valve 120 and is discharged through waste or return discharge pipe 121.

Primary water is supplied through pipe 114 to pipes 75 and 76. Since the pressure of the primary water in annular chamber 73 is now greater than the pressure above piston 69, piston 69 rises permitting primary water to flow from annular chamber 73 into chamber 72. This primary water passes out from chamber 72 through pipe 74. The pressure of the primary water closes diaphragm valves 117 and 118 which in turn closes a valve between pipes 61 and 122 and a valve between pipes 62 and 123 respectively, thereby locking the pistons in differential control 77 in the position shown in FIGURE 8. Primary water passes through pipe 91, chamber 87 and pipe 95 into servo motor hold control 100 causing pistons 102, 103, 104 and 105 to move to the left-hand position thereof. When the pistons move to the left-hand position, water in chambers 110 and 107 is discharged through pipe 94, chamber 88, pipe 90, check valve 120 and waste or return discharge line 121 and through pipes 111, 124, check valve 120 and waste or return discharge line 121. When the servo motor hold control pistons are in the left-hand position, primary water is supplied through pipe 112 to pipe 31 through the chamber defined between pistons 104 and 105 and housing 101. Pipe 31 is connected to pipes 63 and 64 (FIGURE 7), and the primary water flowing therein causes pistons 59a and 59b to rise, while pistons 59c and 59 descend in their respective cylinders, so that the valves shown as open in FIGURE 7 now close, and the valves shown as closed in FIGURE 7 now open. Water is discharged from the various cylinders through pipes 65, 66 and 32. The discharged water is pipe 32 flows through a chamber defined by pistons 104 and 105 and housing 101 into pipes 111 and 124, and then through check valve 120 and waste or return discharge line 121. In this manner, liquid passing into inlet means 12 is diverted so that filtering means 1 begins to strain the liquid, while filtering means 2 is cleaned, and this changeover is fully automatic. During the changeover the pressure in pipes 35 and 36 will be equalized, and diaphragm 46 will be restored to the position shown in FIGURE 8, plunger 49 being returned to its non-deflected position by spring 69, which causes valve 67 to reseat. After valve 67 has reseated, the pressure above piston 69 will become equal to the pressure below piston 69, pressure equalization being obtained by means of the small passageways 70 in piston 69. Because the surface area on the top of piston 69 is greater than the surface on the bottom thereof, when pressure equalization above and below piston 69 is obtained, piston 69 will move downwardly to the position shown in FIGURE 8, thereby sealing off annular chamber 73 from chamber 72. The pressure in chamber 72 and pipe 74 drops slowly through regulating needle value 119 causing diaphragm valves 117 and 118 to open, thereby placing pipes 61 and 122 and pipes 62 and 123 in fluid flow relationship. Since pipe 61 is connected in fluid flow relationship with the discharge end of a pump connected between inlet means 13 and outlet means 14 (see FIGURES 4 and 7), while pipe 62 is connected in fluid flow relationship with the suction end of the pump, the pressure in pipe 61 will now be greater than the pressure in pipe 62. This pressure differential is transmitted to differential control 77 through pipes 61, 122, 98, 99, 62, 123, 97 and 93, causing the pistons of differential control 77 to move to the right, water in chambers 89 and 85 being expelled through pipes 93 and 97. Thus when the changeover operation is complete, the pistons of servo motor hold control 100 are in the left-hand position, while the pistons of differential control 77 are in the right-hand position. In this position, pipe 91 is connected in fluid flow relationship with pipe 94, but no primary water flows therethrough, and the control apparatus is ready for the next changeover operation. The next changeover operation will be such that the pistons in servo motor hold control 100 will be moved to the right-hand position shown in FIGURE 8, causing primary water to be supplied to pipe 32, causing pistons 59, 59a, 59b and 59c and the valves associated therewith (FIGURE 7) to return to the positions thereof shown in FIGURE 7, and finally causing the pistons of differential control 77 to return to the position shown in FIGURE 8.

Control system 30 just described, when used in connection with the apparatus shown in FIGURE 6, operates in exactly the same manner and causes rotor 24 to rotate from the position shown in solid outlines to the position shown by the dotted lines, thereby automatically reversing the functions of filtering means 1 and 2.

*General*

In the embodiments of my invention previously described, I have described the self-cleansing mode of operation of straining apparatus embodying my invention. An important feature of straining apparatus embodying my invention, however, is that it may be cleaned by means of a solvent rather than self-cleaned, one of the filters being solvent cleaned, while the other is filtering a liquid. How this may be achieved is shown in FIGURE 9, which is identical to FIGURE 1, except that the discharge end of pump 15 is not connected to inlet means 13. I have also provided a solvent cleansing system which comprises a receptable 125 containing a solvent 126 therein. Solvent 126 is introduced into liquid carrying member 8 through a pipe 127 and a pump 128. Outlet means 12 is connected through a pipe 129 to receptacle 125.

The embodiment of my invention illustrated in FIGURE 9 is suitable where it is desired to filter a liquid and recover the filtered liquid, which may be, for example, oil.

In operation, the oil or other liquid to be filtered and recovered is drawn through inlet means 12, passes through valve means 10, liquid carrying member 7, inlet-outlet means 3 and is passed through filtering means 1 which removes any foreign particles entrained in the oil. The oil is then passed out of filtering means 1 through inlet-outlet means 4 and flows through liquid carrying member 8, valve means 9, outlet means 14 and pump 15, the oil discharged from pump 15 being clean filtered oil which may be used as desired. At the same time solvent is passed from receptacle 125 through pump 128, pipe 127, inlet means 13, valve means 9, liquid carrying member 8, inlet-outlet means 5 and into filtering means 2. The solvent 126 passes through filtering means 2, cleaning the same, and is then passed out of filtering means 2 through inlet-outlet means 6 and is returned to receptacle 125 through liquid carrying member 7, valve means 10, outlet means 11 and pipe 129. Particles removed from filtering means 2 by solvent 126 settle to the bottom of receptacle 125 and form a sludge therein which can be removed from time to time, solvent 126 being recirculated. When filtering means 1 becomes clogged and strains inefficiently, members 16 and 17 may be automatically moved by means previously described to their other position, whereby the oil to be filtered will be passed through filtering means 2 which has just been cleaned, while solvent 126 is passed through filtering means 1, cleaning the same.

Any suitable solvent 126, either gaseous or liquid, such as, for example, steam, may be employed. The choice of the solvent depends upon the nature of the liquid being filtered, and the solvent may or may not be recirculated.

It will be apparent from a consideration of the three embodiments of my invention illustrated and described, that each is adapted for self-cleansing or solvent cleansing.

It should be noted that pipe 127 (FIGURE 9) could be connected to outlet means 11 while pipe 129 could be connected to inlet means 13, since it is not important in which direction solvent 126 flows through a filter as long as the direction of flow of the cleansing fluid through a filter is opposite to the direction of flow of the fluid previously passed through the filter and strained therein.

It also should be noted that while in the self-cleansing embodiment of my invention I have stated that pump 15 is connected between inlet means 13 and outlet means 14, it is not essential that pump 15 be so connected. Pump 15 may be placed anywhere in the liquid circuit that delivers clean liquid from one of the filtering means to the other. If it does not matter that liquid with entrained particles therein passes through pump 15, then the pump may be connected anywhere in the fluid circuit, for example, the discharge end of the pump may be connected to inlet means 11, while the suction end of the pump is connected in fluid flow relationship with the liquid to be filtered by the straining apparatus.

My invention has been illustrated in particular embodyiments and applications. It is to be understood, however, that the embodiments given are illustration only and should not be construed as limiting the invention. Such embodiments of the invention as come within the scope and purview of the appended claims are to be considered as part of my invention.

What I claim as my invention:

1. Straining apparatus comprising first filtering means, including a first filter and second filtering means including a second filter, said first filtering means having first inlet-outlet means and second inlet-outlet means, said second filtering means having third inlet-outlet means and fourth inlet-outlet means, said first filter being disposed in the liquid path between said first and second inlet-outlet means, said second filter being disposed in the liquid path between said third and fourth inlet-outlet means, first liquid carrying means connected between said first inlet-outlet means and said fourth inlet-outlet means, first valve means interposed in said first liquid carrying means, second liquid carrying means connected between said second inlet-outlet means and said third inlet-outlet means, second valve means interposed in said second liquid carrying means, a first inlet means in said first liquid carrying means for receiving a liquid to be filtered, a first outlet means in said first liquid carrying means for discharging a liquid which has passed through both of said filters, a second inlet means in said second liquid carrying means, a second outlet means in said second liquid carrying means, said first valve means being interposed between said first inlet and first outlet means and also being interposed between said first and fourth inlet-outlet means, said second valve means being interposed between said second inlet and second outlet means and also being interposed between said second and third inlet-outlet means, said first and second valve means being movable to first and second positions, means including a pump interconnecting said second inlet means and said second outlet means in fluid-flow relationship, said pump having a suction inlet and a discharge outlet, said suction inlet being connected to said second outlet means, said discharge outlet of said pump being connected only to said second inlet means to discharge all of the liquid pumped by said pump into said second inlet means, and means for moving said first and second valve means into either said first position or said second position, said first valve means in said first position connecting said first inlet-outlet means and said first inlet means in fluid flow relationship and connecting said fourth inlet-outlet means and said first outlet means in fluid flow relationship, said second valve means in said first position connecting said second inlet-outlet means and said second outlet means in fluid flow relationship and connecting said second inlet means and said third inlet-outlet means in fluid flow relationship, said first valve means in said second position connecting said first inlet means and said fourth inlet-outlet means in fluid flow relationship and connecting said first inlet-outlet means and said first outlet means in fluid flow relationship, said second valve means in said second position connecting said third inlet-outlet means and said second outlet means in fluid flow relationship and connecting said second inlet-outlet means and said second inlet means in fluid flow relationship, said first valve means in either of said positions preventing any substantial direct liquid flow in said first liquid-carrying means between said first inlet-outlet means and said fourth inlet-outlet means and preventing any substantial direct liquid flow between said first inlet means and said first outlet means, said second valve means in either of said positions preventing any substantial direct liquid flow in said second liquid-carrying means between said second inlet-outlet means and said third inlet-outlet means and preventing any substantial direct liquid flow between said second inlet means and said second outlet means other than through said means interconnecting said second inlet means and said second outlet means, all of the liquid passing into said straining apparatus during operation thereof through said first inlet means being constrained by said straining apparatus to pass through both of said filters in series and discharge from said straining apparatus through said first outlet means in both of said positions of said valve means.

2. Straining apparatus according to claim 1 including means for sensing a pressure differential between said first inlet means and said second outlet means, control means responsive to a pressure differential of predetermined magnitude for actuating said means for moving said first and second valve means, said means for moving said first and second valve means from one of said positions to the other of said positions automatically moving said first and second valve means in response to said pressure differential of a predetermined magnitude.

3. Straining apparatus according to claim 2 wherein said means for automatically moving said first and second valve means from one of said positions to the other of said positions in response to a pressure differential of a predetermined magnitude includes hydraulically operated piston means adapted to move said first and second valve means from one of said positions to the other of said positions, said control means including means for supplying a fluid to said piston means to actuate said piston means and said valve means in response to said pressure differential of said predetermined magnitude from one of said positions to the other of said positions.

4. Straining apparatus according to claim 2 wherein said means for automatically moving said first and second valve means from one of said positions to the other of said positions in response to a pressure differential of a predetermined magnitude includes a housing having a rotor and a stator therein, means connecting said rotor to said valve means, said control means including means for supplying a fluid into said housing between said rotor and said stator to rotate said rotor and said valve means in response to said pressure differential of said predetermined magnitude from one of said positions to the other of said positions.

References Cited in the file of this patent

UNITED STATES PATENTS

| | | |
|---|---|---|
| Re. 23,469 | Zollinger | Mar. 4, 1952 |
| 844,438 | Bayley | Feb. 19, 1907 |
| 1,568,001 | Seligman | Dec. 29, 1925 |
| 1,627,186 | Lalor | May 3, 1927 |
| 1,774,758 | Morse et al. | Sept. 2, 1930 |
| 2,454,124 | Birch et al. | Nov. 16, 1948 |
| 2,940,517 | Skellern | June 14, 1960 |
| 2,970,696 | Mummert | Feb. 7, 1961 |

FOREIGN PATENTS

| | | |
|---|---|---|
| 699,915 | Germany | Dec. 11, 1940 |

OTHER REFERENCES

Bruins et al.: Abstract, 770,212, Sept. 2, 1952.